US012513122B2

(12) United States Patent
Larsen

(10) Patent No.: US 12,513,122 B2
(45) Date of Patent: Dec. 30, 2025

(54) SYSTEM AND ASSOCIATED METHODS FOR REMOTE CONTROL OF VESSELS

(71) Applicant: Marine Technologies, LLC, Mandeville, LA (US)

(72) Inventor: Kjell Erik Larsen, Mandeville, LA (US)

(73) Assignee: Marine Technologies, LLC, Mandeville, LA (US)

( * ) Notice: Subject to any disclaimer, the term of this patent is extended or adjusted under 35 U.S.C. 154(b) by 281 days.

(21) Appl. No.: 17/730,047

(22) Filed: Apr. 26, 2022

(65) Prior Publication Data

US 2023/0093869 A1 Mar. 30, 2023

Related U.S. Application Data

(63) Continuation of application No. 16/022,595, filed on Jun. 28, 2018, now Pat. No. 11,316,834.

(Continued)

(51) Int. Cl.
*H04L 29/06* (2006.01)
*G05D 1/00* (2006.01)
(Continued)

(52) U.S. Cl.
CPC ....... *H04L 63/0428* (2013.01); *G05D 1/0022* (2013.01); *G06F 21/606* (2013.01);
(Continued)

(58) Field of Classification Search
CPC . H04L 63/0428; H04L 9/0861; H04L 9/0866; H04L 9/0891; H04L 63/0209;
(Continued)

(56) References Cited

U.S. PATENT DOCUMENTS

2004/0117632 A1* 6/2004 Arling .................. H04L 9/0891
713/182
2005/0268834 A1 12/2005 Koda et al.
(Continued)

FOREIGN PATENT DOCUMENTS

EP 3 150 460 A1 4/2017

OTHER PUBLICATIONS

Lin, "A Survey of Internet of Things: Architecture, Enabling Technologies, Security and Privacy, and Applications", 2017, IEEE, pp. 1-17 (Year: 2017).*

(Continued)

*Primary Examiner* — Taghi T Arani
*Assistant Examiner* — Gregory A Lane
(74) *Attorney, Agent, or Firm* — Foley & Lardner LLP

(57) ABSTRACT

A machine and process for remotely controlling a vessel. The system may include a land-based computing system configured to communicate control signals via a communications system that communicates the control signals to the vessel and a controller network on the vessel configured to control at least certain functions of the vessel. The controller network may further be configured to receive the control signals from the land-based computing system. The controller may include a switch including an input port and multiple output ports. A remote control computing device may be configured to control the vessel via at least one other computing device. A one-way Ethernet cable may be communicatively coupled between one of the output ports of the switch and the remote control computing device. The control signals may be received by the switch being communicated to the remote control computing device via the one-way Ethernet cable.

20 Claims, 4 Drawing Sheets

Related U.S. Application Data

(60) Provisional application No. 62/526,119, filed on Jun. 28, 2017.

(51) Int. Cl.
  *G06F 21/60* (2013.01)
  *H04L 9/08* (2006.01)
  *H04L 9/40* (2022.01)
  *G06F 21/85* (2013.01)

(52) U.S. Cl.
  CPC .......... *H04L 9/0861* (2013.01); *H04L 9/0866* (2013.01); *H04L 9/0891* (2013.01); *H04L 63/0209* (2013.01); *G06F 21/85* (2013.01); *H04L 2209/84* (2013.01)

(58) Field of Classification Search
  CPC . H04L 2209/84; G05D 1/0022; G06F 21/606; G06F 21/85
  USPC .......................................... 713/153
  See application file for complete search history.

(56) References Cited

U.S. PATENT DOCUMENTS

| | | | |
|---|---|---|---|
| 2006/0173581 A1* | 8/2006 | Elkayam | G06F 1/305 |
| | | | 700/297 |
| 2010/0185342 A1 | 7/2010 | Wubker, Jr. | |
| 2010/0316221 A1* | 12/2010 | Tie | H04N 21/25816 |
| | | | 380/279 |
| 2014/0082369 A1 | 3/2014 | Waclawsky et al. | |
| 2015/0188985 A1 | 7/2015 | Marty et al. | |
| 2016/0121986 A1 | 5/2016 | Riski et al. | |
| 2016/0205133 A1 | 7/2016 | Mackey et al. | |
| 2017/0045887 A1 | 2/2017 | Mazin | |

OTHER PUBLICATIONS

Yagdereli, "A study of cyber-security of autonomous and unmanned vehicles", 2015, Journal of Defense Modeling and Simulation, pp. 369-379 (Year: 2015).*

Final Office Action on U.S. Appl. No. 16/022,595 Dtd Mar. 29, 2021.

International Search Report and Written Opinion for corresponding PCT/US2018/040144 mailed Dec. 17, 2018, 10 pages.

Non-Final Office Action on U.S. Appl. No. 16/022,595 Dtd Jun. 18, 2020.

Notice of Allowance on U.S. Appl. No. 16/022,595 Dtd Dec. 22, 2021.

* cited by examiner

SYSTEM AND ASSOCIATED METHODS FOR REMOTE CONTROL OF VESSELS

CROSS-REFERENCE TO RELATED APPLICATIONS

This application is a Continuation Application of co-pending U.S. patent application Ser. No. 16/022,595, filed Jun. 28, 2018, which claims priority to the U.S. Patent Application No. 62/526,119, filed Jun. 28, 2017, the entire contents of which are incorporated herein by reference.

This application is also related to the PCT Application No. PCT/US2018/040144, filed Jun. 28, 2018, the entire contents of which is incorporated herein by reference.

FIELD OF THE INVENTION

The present invention relates to remote control of vessels and, more specifically, to protecting onboard vessel systems against cyberattacks.

BACKGROUND OF THE INVENTION

Computer networks have been experiencing an increase in cyber hacking and viruses as attackers become more sophisticated and industry standards become public. Encryption of data is a typical safety measure that companies take to attempt preventing their data from falling into the wrong hands. However, attackers have begun connecting to hardware and reading data that can eventually lead to breaking an encryption.

An additional complication for network security is the advancement of remotely controlling a vessel via a computer network. A remotely controlled vessel via a computer network is inherently open to external access, which may lead to an attacker introducing malware into the computer network. Solutions including a solely software-based protection system have become increasingly penetrable. Attackers can use conventional communications networks as means of accessing an encryption algorithm and receiving effective intelligence regarding the details of the encryption algorithm along with communications ports on computing systems for further infiltrating communications networks.

Vessels, such as marine or maritime vessels, continue to see innovative solutions to control, operation, and feedback issues, many of which involve remote control of the vessels. As with the rest of the industry, remote control of maritime vessels is highly susceptible to outside attacks, even when implementing the most advance software based encryption models. Consequences of a successful cyberattack on a maritime vessel are high and the cyber war on the high seas for control of the remote networks driving those vessels is vital to the future of freedom (to operate) at sea. Remote controlled vehicles, such as automobiles, trucks, airplanes, drones, and so forth, face similar problems.

BRIEF SUMMARY OF THE INVENTION

Communications to and remote control of vessels, such as marine vessels, are typically performed by sending data and control signals to a remote control computer on the vessels. To protect against cyberattacks of the vessels, remote controlling of a vessel may be performed by using a one-way Ethernet cable between a switch and a remote control computing device aboard the vessel. The use of the one-way Ethernet cable should prevent upward of 98% or 99% of cyberattacks, as the one-way Ethernet cable may prevent hacker-driven feedback signals from "port sniffing" or otherwise being communicated from the remote control computing device to the switch or the land-based computing system, thereby preventing attackers from accessing an onboard ship command and control systems. Control signals may be communicated from a land-based computing system to the switch. Data in a command and control systems on the vessel may be encrypted using an encryption key formed from vessel data so as to provide for some level of randomness not obtainable from a remote location.

One embodiment of a system for remotely controlling a vessel may include a land-based computing system configured to communicate control signals via a communications system that communicates the control signals to the vessel and a controller network on the vessel configured to control at least certain functions of the vessel. The controller network may further be configured to receive the control signals from the land-based computing system. The controller may include a switch including an input port and multiple output ports. A remote control computing device configured to control the vessel via at least one other computing device, and a one-way Ethernet cable communicatively coupled between one of the output ports of the switch and the remote control computing device. The control signals may be received by the switch being communicated to the remote control computing device via the one-way Ethernet cable, thereby preventing feedback signals being communicated from the remote control computing device to the switch or the land-based computing system.

One embodiment of a method for remotely controlling a vessel may include communicating control signals via a communications system to the vessel, controlling at least certain functions of the vessel, and in response to receiving the control signals, one-way communicating the control signals to a remote control computing device, thereby preventing feedback signals from the remote control computing device.

One embodiment of a system for remotely controlling a vessel may include a land-based computing system configured to communicate control signals via a communications system configured to communicate the control signals to the vessel and a controller network on the vessel configured to control at least certain functions of the vessel. The controller network may further be configured to receive the control signals from the land-based computing system. The controller may include a remote control computing device configured to control the vessel via at least one other computing device. At least one of the remote control computing device and the other computing device(s) may be configured to generate an encryption key based on at least one sensed parameter at the vessel.

One embodiment of a method for remotely controlling a vessel may include communicating control signals via a communications system to the vessel, controlling at least certain functions of the vessel in response to receiving the control signals, generating an encryption key based on at least one sensed parameter at the vessel, and using the generated encryption key for encrypting future communications of the control signals to the vessel.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
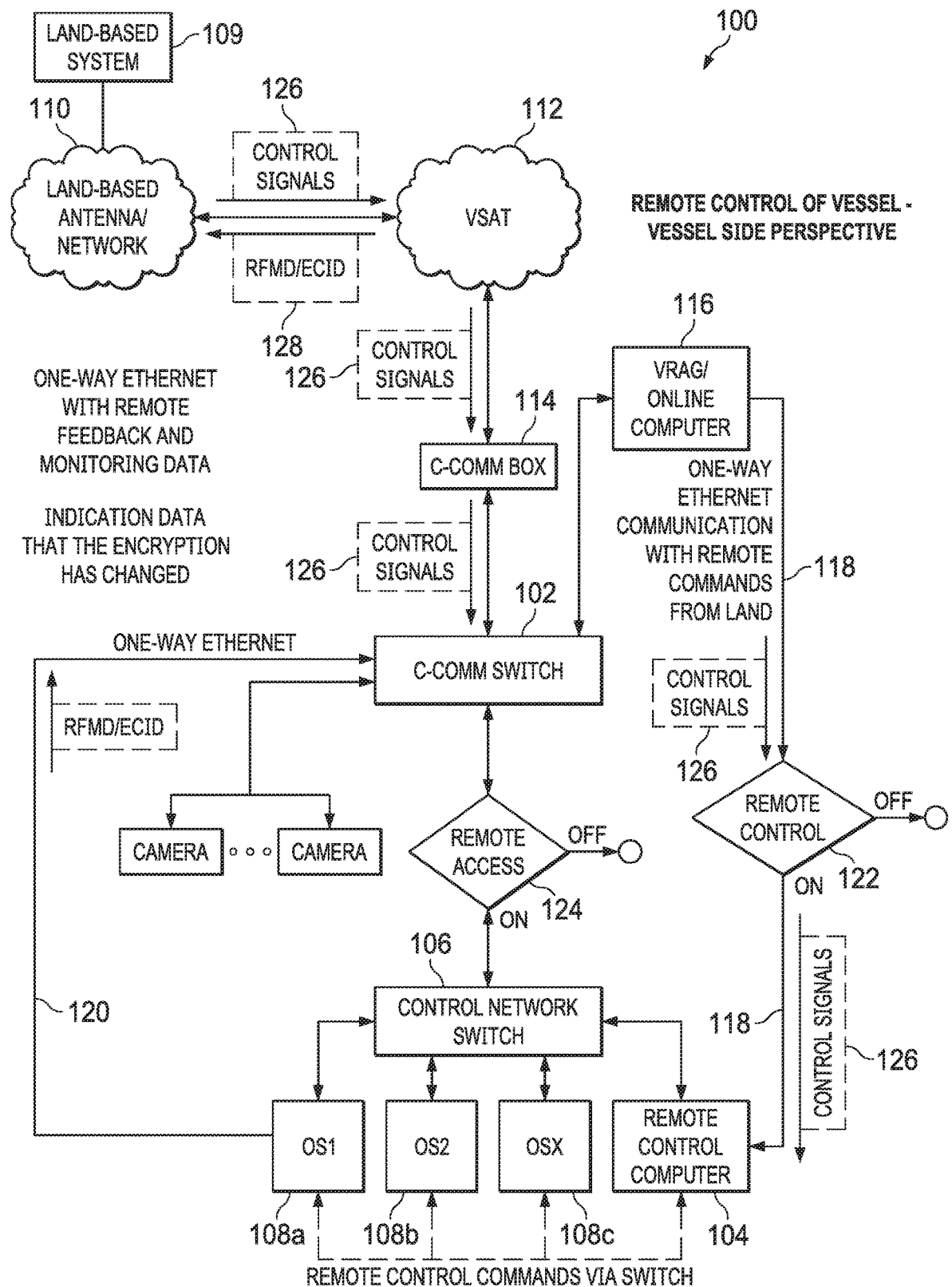
FIG. 1 is a schematic illustration of electronics of a system on a vessel used for remotely controlling the vessel.

With regard to FIG. 1, schematic illustrations of a system 100 on a vessel used for remote control of the vessel are shown. The system may include a network switch 102, a remote control computing device 104 communicatively coupled to the switch 102, a control network switch 106 communicatively coupled to the remote control computing device 104, and at least one other computing device 108a-108c (collectively 108) communicatively coupled to the control network switch 106.

The system 100 may communicate with a land-based system 109 via a land-based antenna/network 110 and a very small aperture terminal (VSAT) 112. In one embodiment, the system 100 may further include a communication box 114 that may be configured to communicate with the VSAT 112. The communication box 114 may be used to verify security of data, such as control signals, received from the VSAT 112. In another embodiment, the system 100 may further include an online computer 116 configured to be aboard the vessel. A one-way Ethernet cable 118 may be connected to the computer 116 for communicating data to the remote control computer 104.

The vessel may include any of a ship, boat, water based transportation vehicle, land based transportation vehicle, air based transportation vehicle, or any other remotely controlled vehicle. One of skill in the art will appreciate that a remote control vehicle may operate substantially the same regardless of a medium or mode of travel.

In an embodiment, the switch 102 is configured to communicate to the remote control computing device 104 through a one-way Ethernet cable 118. The one-way Ethernet cable 118 may enable communication to flow in only one direction, for example, only from the computer 116 to the remote control computing device 104 with no communication or data returning. Further, the at least one other computing device 108 may communicate with the switch 102 via another one-way Ethernet cable 120. In one embodiment, the switch 102 may be configured to communicate control signals 126, such as, but not limited to, remote commands, from a land-based system 109, and also land-based system 200 of FIG. 2. One-way Ethernet connections may prevent internet protocol or port sniffing, a commonly used method for hacking, as well as other malware or viruses from being successfully used in a cyberattack against a remote control computer and/or other computer on a remotely controlled vessel. The control signals 126 may be received by the VSAT 112 from the land-based antenna/network 110 and then transmitted to the communication box 114. The communication box 114 may forward the control signals 126 to the switch 102. The switch 102 may communicate the control signals 126 via the VRAG computer 116, which in turn communicates the control signals 126 to the remote control computing device 104 using the one-way Ethernet cable 118.

In one embodiment, the system 100 may further include a remote control mechanism 122, such as an electronic device with a controllable switch, that may be configured to allow the land-based system 109 to control flow of data communication on the one-way Ethernet cable 118. The control of the flow of data communication may include an ON status that may allow the flow of communication and an OFF status that may prevent the flow of communication. Furthermore, the control network switch 106 may be communicatively coupled to the switch 102 via a remote access point 124. The remote control mechanism 122 and the remote access point 124 may include one or more remote control key switches that may kill remote control or remote access of the system 100.

The other one-way Ethernet cable 120 may be configured to deliver remote feedback and monitoring data as well as an indication that an encryption has changed, such as remote feedback and monitoring data/encryption change indication data (RFMD/ECID) 128 from the at least one other computing device 108 to the switch 102 via the Ethernet cable 120. The switch may communicate the RFMD/ECID 128 back to the land-based system 200 by way of a path through the communication box 114, the VSAT 112, and the land-based antenna/network 110. However, no hacker-driven feedback, such as, but not limited to, a response to "port sniffing," may pass to the outside world (i.e., from the control computer of the vessel to another computer off the vessel), due to communication occurring via separate computers (e.g., remote control computer 104 and OS11 computer 108a). The one-way Ethernet cable 120 may also help with preventing effects of malware (e.g., computer viruses), or otherwise. In one embodiment, one-way user datagram protocol (UDP) remote control packages configured to utilize a specific port number in Ethernet protocol may reject all other ports at a switch level at switch 102. In one embodiment, the system 100 may further include a communications device (not shown) configured to verify security of the control signals in response to receiving the control signals. In one embodiment, at least one of the one-way Ethernet cable 118 and the other one-way Ethernet cable 120 may be physically and electrically connected to an output port. The control signals 126 may be routed via the output port to which the one-way Ethernet cable 118 is connected.

In one embodiment, the system 100 may further utilize encryption based communications, such as, but not limited to, an encryption key using randomly generated data and computer-based hardware. In one embodiment, the randomly generated data includes at least one of vessel data (e.g., operational and/or environmental data measured at the vessel), such as, but not limited to, wind speed, pitch of the vessel, yaw of the vessel, roll of the vessel, heading of the vessel, speed of the vessel, celestial based navigation data of the vessel, and global positioning system (UPS) data of the vessel. The vessel data may be (i) random in nature, and (ii) provide no pattern that may be predictable to cyber attackers. The encryption key may change in time intervals (e.g. every X hours, every Y minutes), which may reduce a possibility of brute force solutions to find the encryption key. In another embodiment, the intervals may be aperiodic. In an embodiment, a combination of vessel data may be utilized. Still yet, the vessel data selected to be used for the encryption may change over time (e.g., change vessel data daily, such as, day 1: wind speed, vessel speed; day 2: pitch/yaw of vessel; etc.). The encryption key may be generated by at least one of the remote control computing device 104 and the at least one other computing device 108. In one embodiment, the land-based system 109 may be configured to communicate the control signals using an encryption.

Figure 2:
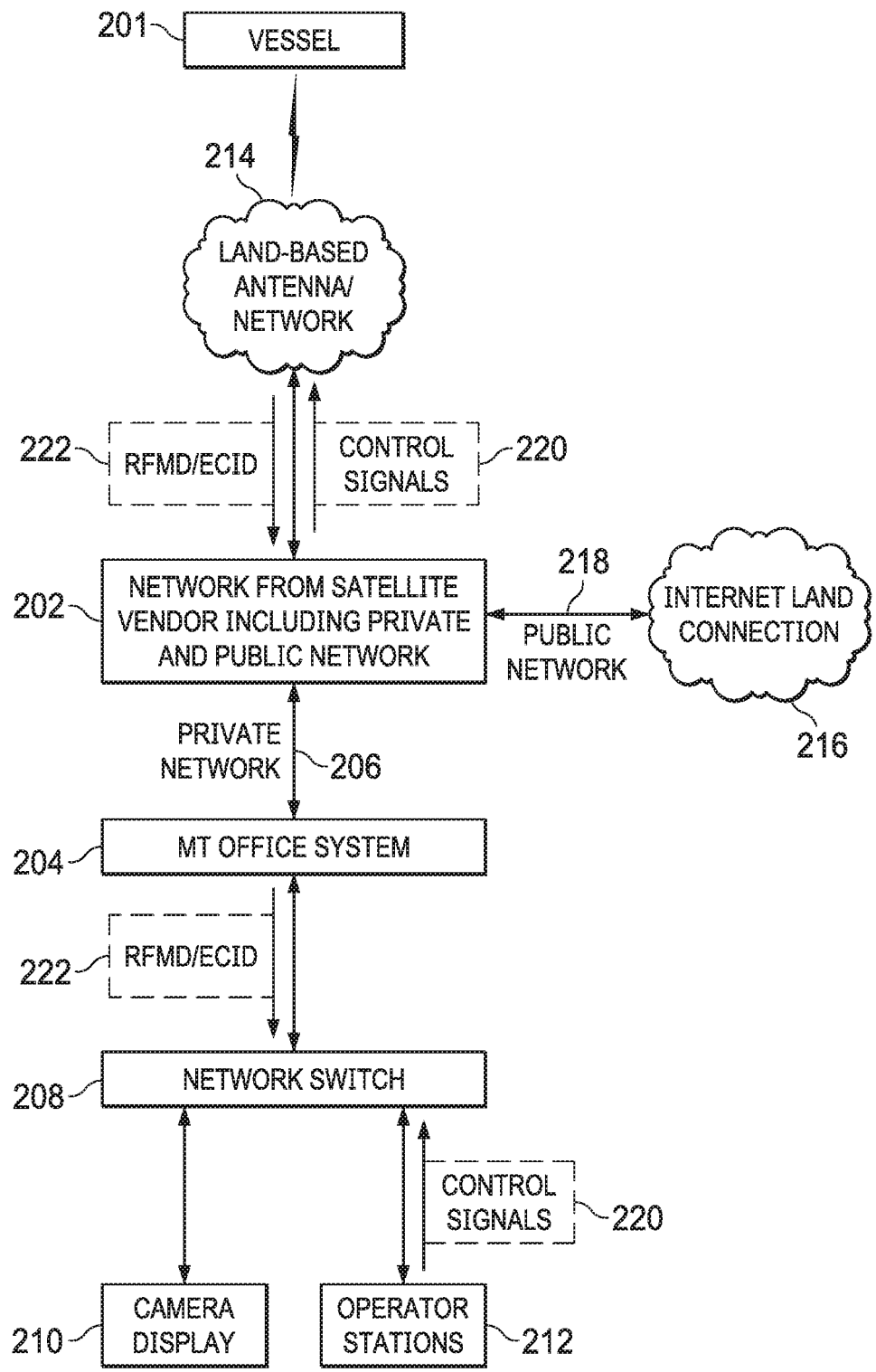
FIG. 2 is a schematic illustration of electronics of a land-based system used for remotely controlling a vessel.

With regard to FIG. 2, illustrations of a schematic of electronics of a land-based system 200 that is used for remote control of a vessel 201 are shown. The land-based system 200, such as a land-based computing system, may include a network 202 and an office system 204 may include computing and communications equipment (e.g., a network operations center (NOC)) communicatively coupled to the network 202 via a private network 206. The office system 204 may be communicatively coupled to a network switch 208. The network switch 208 may include at least three ports. The first port may be communicatively coupled to the office system 204. The second and third ports may be communicatively coupled to a camera display 210 and at least one operator station 212. Other equipment and communications configurations may be utilized in accordance with the principles described herein.

The network 202 may be configured to communicate to vessels via a land-based antenna 214, which may operate as the land-based antenna/network 110 of FIG. 1. In one embodiment, the land-based system 200 may further include an Internet land connection 216 via a public network 218. The operator station(s) 212 may support encryption for added safety and security. Encryption may be based on live or real-time vessel data and computer-specific hardware, as previously described.

The office system 204 may connect to the network 202 through the private network 206, such as, but not limited to, a privately owned Ethernet connection to the network 202. The private network 206 may be configured to be isolated from the Internet. The private network 206 may reduce potential access to data being communicated between the land-based system 200 and the vessel. The network 202 may handle security in terms of software, firmware, and hardware separation of the private network 206 and the public network 218.

In one embodiment, a method for remotely controlling a vessel may include communicating control signals 220 via a communications system to the vessel to control at least certain functions of the vessel. In response to receiving the control signals, the control signals may be one-way communicated to a remote control computing device on the vessel, thereby preventing feedback signals from the remote control computing device. Remote feedback and monitoring data/encryption change indication data (RFMD/ECID) 222 may be communicated from the land-based antenna/network 214 to the satellite network 202 for communication to the office system 204 that may operate in the same or similar manner as the land-based system 109 of FIG. 1.

Figure 3:
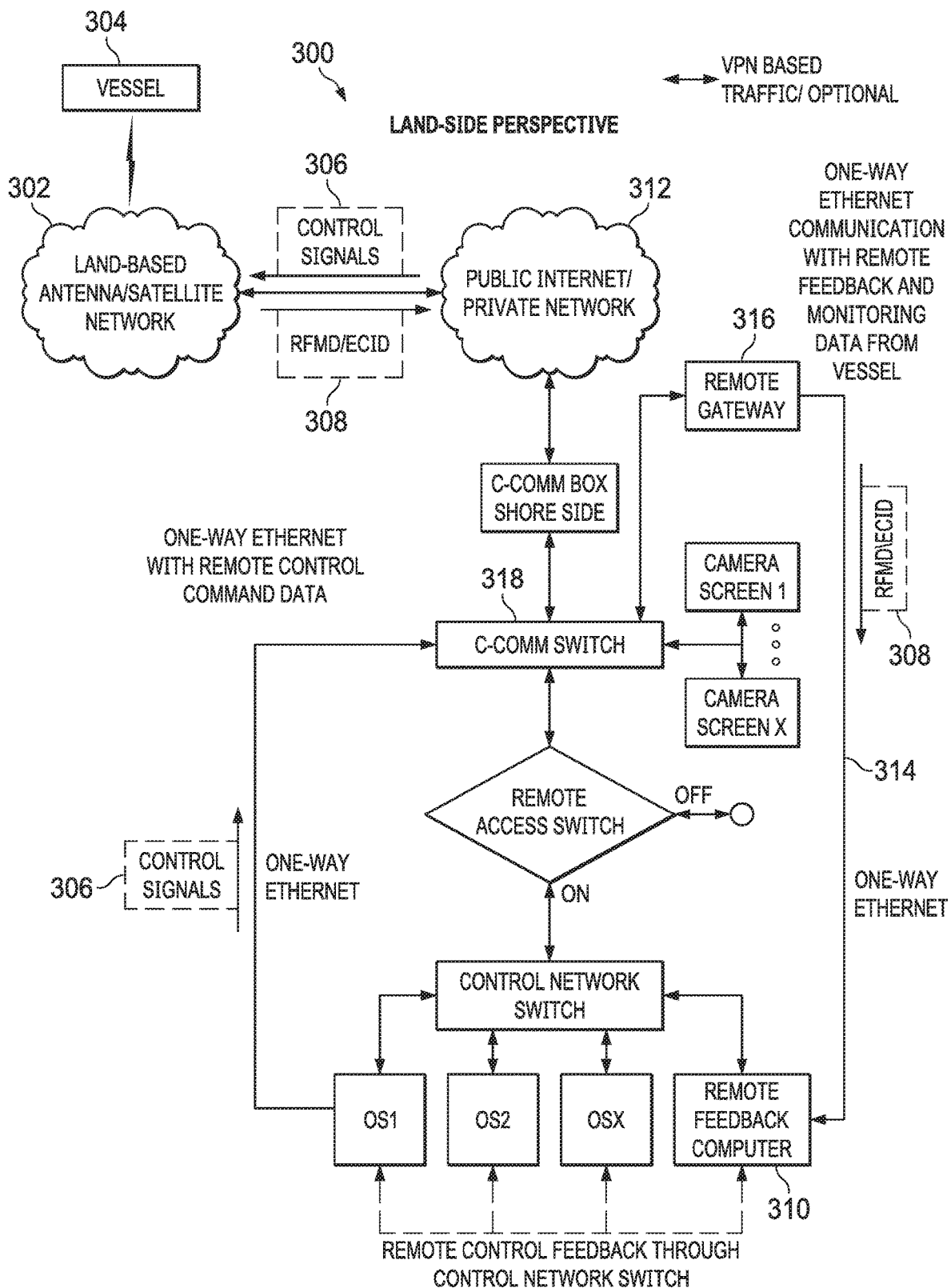
FIG. 3 is a schematic illustration of electronics of a land-based system used for remotely controlling a vessel that includes one-way Ethernet communications to provide security similar to that of the vessel.

With regard to FIG. 3, a schematic illustration of electronics of a land-based system 300 used for remotely controlling a vessel that includes one-way Ethernet communications to provide security similar to that of the vessel is shown. The land-based system 300 is an alternative embodiment to that shown in FIG. 2, and is a similar configuration to the configuration of the vessel-side configuration of the vessel as shown in FIG. 1 with the exception of not including a remote control switch 122 since the land-side is not being remote controlled. A land-based antenna/satellite network may be used to communicate signals to and from a vessel 304. The signals, as previously described, may include control signals 306 for controlling the remotely controlled vessel 304, and RFMD/ECID signals 308 may be feedback signals. In this case, rather than having a remote control computer 104 of FIG. 1, a remote feedback computer 310 may be included to process the RFMD/EDID signals 308.

In this embodiment, the land-based system 300 may be in communication with a public Internet and/or a private network 312. In the event of being on the public Internet, added security is desired so as to limit cyberattacks, as previously described. In that regard, a one-way Ethernet line 314 may be utilized between a remote gateway and remote feedback computer 310, where the remote gateway 316 is in communication with a communications switch 318. The land-based system 300 may operate as an emulator of the system 100 of the vessel. The feedback signals (e.g., RFMD/ECID 308) may be used to simulate how the vessel and controls thereon are operating.

Figure 4:
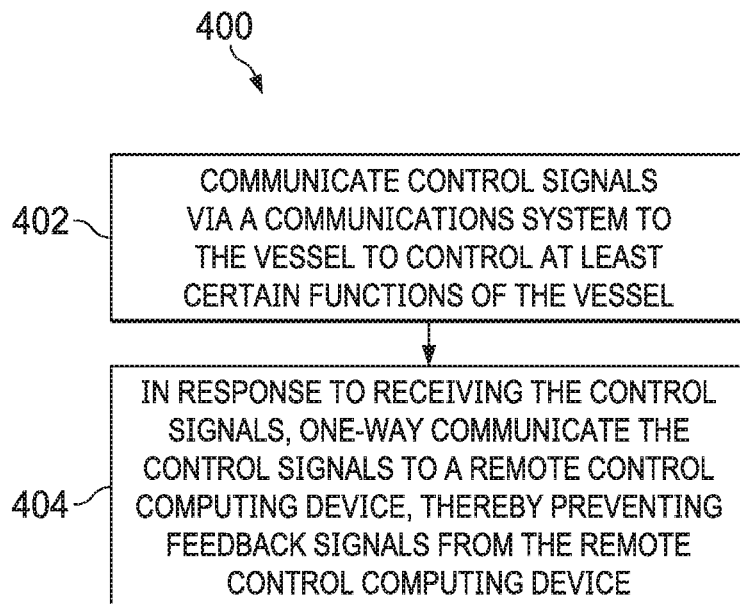
FIG. 4 a flow diagram of an illustrative process for communicating between a land-based system and remote control computer of a vessel for remotely controlling the vessel in a secure manner.

With regard to FIG. 4, a flow diagram of an illustrative process 400 for communicating between a land-based system and remote control computer of a vessel for remotely controlling the vessel in a secure manner is shown. The process 400 may start at step 402 where control signals may be communicated via a communications system to the vessel to control at least certain functions of the vessel. The communications system may include a satellite network when the vessel is off-shore and out-of-reach of terrestrial networks. In an embodiment, control of the vessel may be performed by computers other than a remote control computer that is used for communications purposes. At step 404, in response to receiving the control signals, one-way communicate the control signals to a remote control computing device, thereby preventing feedback signals from the remote control computing device. By preventing the feedback signals from being communicated back from the control computing device, malware and sniffers that are used for cyberattacks may be prevented.

Figure 5:
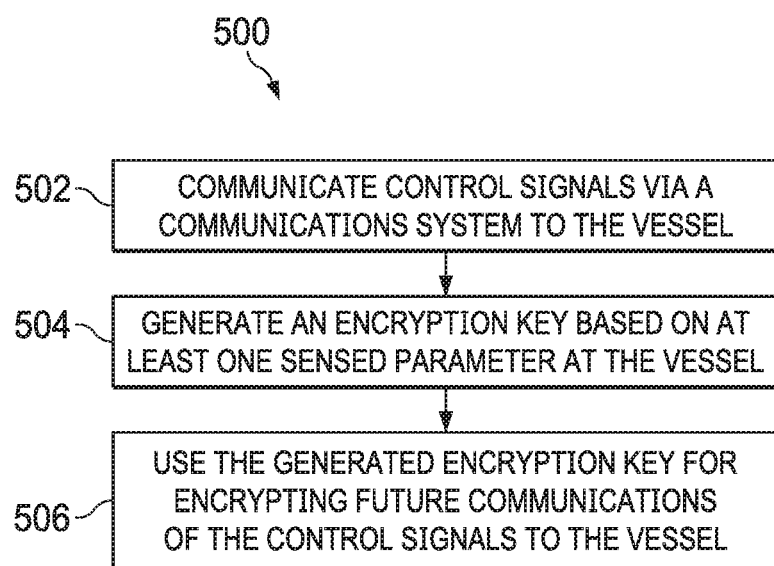
FIG. 5 is a flow diagram of an illustrative process for communicating between a land-based system and remote control computer of a vessel for remotely controlling the vessel in a secure manner.

With regard to FIG. 5, a flow diagram of an illustrative process 500 for communicating between a land-based system and remote control computer of a vessel for remotely controlling the vessel in a secure manner is shown. At step 502, the control signals may be communicated via a communications system to the vessel. At step 504, an encryption key based on at least one sensed parameter at the vessel may be generated. At step 506, the generated encryption key may be used for encrypting future communications of the control signals to the vessel.

In an embodiment, the method may further include generating an encryption key based on at least one sensed parameter at the vessel. For example, generating the encryption key may include generating an encryption key using wind speed sensed at the vessel. As another example, the method generating the encryption key may include generating an encryption key using global positioning system (GPS) data of the vessel. Any other vessel operational parameter and/or environmental parameter may be utilized. In an embodiment, the generating the encryption key may include generating an encryption key on a periodic basis.

In an embodiment, the method may further include communicating an indication that the encryption key changed via the communications system to the land-based computing system. The indication may cause a land-based computing system to update the encryption key being used thereby. In an embodiment, the method may include preventing the one-way communications of the control signals along a one-way communications path along which the control signals are being communicated. In an embodiment, the method may further include verifying security of the control signals in response to receiving the control signals at the vessel.

In an embodiment, the method may further include physically and electrically connecting a one-way communications path to support the one-way communications of the control signals. In an embodiment, the one-way communicating the control signals may include one-way communicating the control signals via an output port to which the one-way communications path is connected, and the method may further include preventing the control signals to be communicated via any other port. In an embodiment, communicating the control signals may include communicating the control signals in an encrypted format.

In one embodiment, a method for remotely controlling a vessel may include communicating control signals via a communications system to the vessel, controlling at least certain functions of the vessel in response to receiving the control signals, generating an encryption key based on at least one sensed parameter at the vessel, and using the generated encryption key for encrypting future communications of the control signals to the vessel. In an embodiment, the method may further include, in response to receiving the control signals, one-way communicating the control signals to a remote control computing device, thereby preventing feedback signals from the remote control computing device.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A system for remotely controlling a vessel, the system comprising:
   a land-based computing system configured to communicate control signals via a communications system to the vessel, the land-based computing system including:
   a remote feedback computer configured to process signals received from the vessel;
   a communications switch in communication with the land-based computing system, the communications switch including an input port and a plurality of output ports, at least one of the output ports in communication with the communications system to enable control signals to be communicated from the land-based computing system to the vessel; and
   a one-way Ethernet cable communicatively coupled between the remote feedback computer and the communications switch, the control signals being communicated via the one-way Ethernet cable when communicated to the vessel; and a controller network on the vessel configured to control at least certain functions of the vessel, the controller network further configured to receive the control signals from the land-based computing system, the controller network including a remote control computing device configured to control the vessel via at least one other computing device in response to receiving the control signals, at least one of the remote control computing device and the at least one other computing device being configured to generate an encryption key based on at least one sensed parameter at the vessel, the at least one sensed parameter includes wind speed.

2. The system according to claim 1, wherein the controller network on the vessel further includes: including:
a second communications switch including an input port and a plurality of output ports; and
a second one-way Ethernet cable communicatively coupled between one of the output ports of the second communications switch and the remote control computing device, the control signals received by the switch being communicated to the remote control computing device, thereby preventing feedback signals being communicated from the remote control computing device to the second communications switch or the land-based computing system.

3. The system according to claim 2, further comprising:
a first remote control key switch in communication with the one-way Ethernet cable to enable communications via the first one-way Ethernet cable to be prevented; and
a second remote control key switch in communication with the second one-way Ethernet cable to enable communications via the second one-way Ethernet cable to be prevented.

4. The system according to claim 2, wherein the one-way Ethernet cable is physically and electrically connected to an output port of the communications switch.

5. The system according to claim 4, wherein the control signals are routed via the output port of the communications switch to which the one-way Ethernet cable is connected.

6. The system according to claim 2, wherein an indication that the encryption key changed is communicated via the second communications switch to the land-based computing system.

7. The system according to claim 1, wherein at least one of the remote control computing device and the at least one other computing device are configured to generate an encryption key based on at least one sensed parameter at the vessel, wherein the at least one sensed parameter further includes global positioning system (GPS) data of the vessel.

8. The system according to claim 1, wherein at least one of the remote control computing device and the at least one other computing device are configured to generate an encryption key based on at least one sensed parameter at the vessel, wherein the encryption key is updated on a periodic basis.

9. The system according to claim 2, wherein the controller network on the vessel further includes a communications device configured to verify security of the control signals in response to receiving the control signals.

10. The system according to claim 1, wherein the land-based computing system is configured to communicate the control signals using an encrypted format.

11. A method for remotely controlling a vessel, the method comprising:
communicating control signals via a communications system to the vessel to control at least certain functions of the vessel from a land-based computing system;
processing signals by a remote feedback computer received from the vessel;
communicating the control signals via a one-way communications path prior to the control signals being communicated over the communications system when communicated to the vessel;
receiving, by a controller network on the vessel, the control signals from the land-based computing system, the vessel being controlled by a remote control computing device of the controller network in response to the control signals being received,
generating an encryption key based on at least one sensed parameter at the vessel, the at least one sensed parameter includes wind speed.

12. The method according to claim 11, further comprising, in response to receiving the control signals, one-way communicating the control signals to the remote control computing device on the vessel, thereby preventing feedback signals being communicated from the remote control computing device.

13. The method according to claim 11, wherein communicating the control signals via a one-way communications path includes communicating the control signals via a one-way Ethernet cable.

14. The method according to claim 13, further comprising physically and electrically connecting the one-way communications path to support the one-way communications of the control signals.

15. The method according to claim 14,
wherein communicating the control signals includes one-way communicating the control signals via an output port of a communications switch to which the one-way communications path is connected; and
further comprising preventing the control signals to be communicated via any other port.

16. The method according to claim 11, wherein generating an encryption key further includes further comprising generating an encryption key using global positioning system (GPS) data of the vessel.

17. The method according to claim 11, wherein further comprising generating an encryption key includes generating an encryption key on a periodic basis.

18. The method according to claim 17, further comprising communicating an indication that the encryption key changed via the communications system to the land-based computing system.

19. The method according to claim 11, further comprising verifying security of the control signals in response to receiving the control signals at the vessel.

20. The method according to claim 11, wherein communicating the control signals includes communicating the control signals in an encrypted format.

* * * * *